No. 610,448. Patented Sept. 6, 1898.
L. ILLMER, JR.
MUTE CLAVIER.
(Application filed Sept. 28, 1897.)
(No Model.) 3 Sheets—Sheet 1.
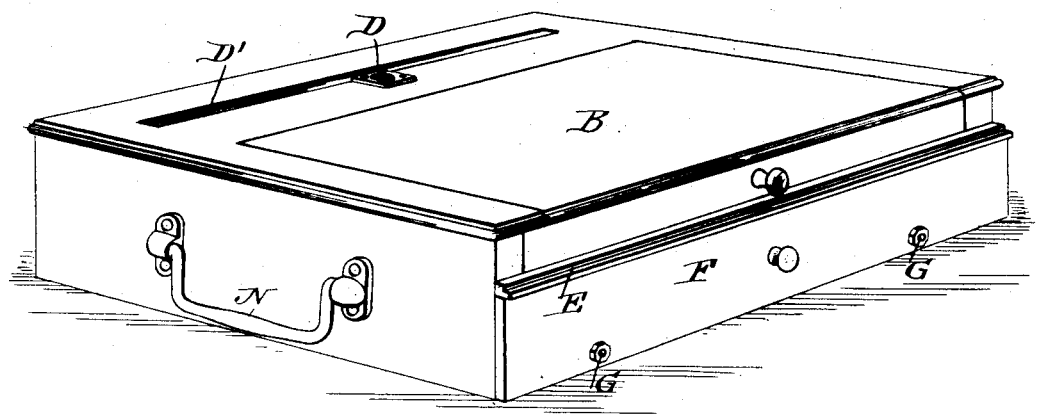
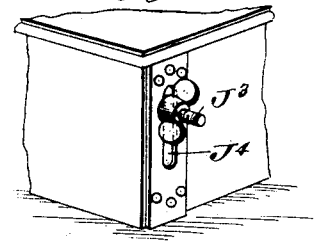
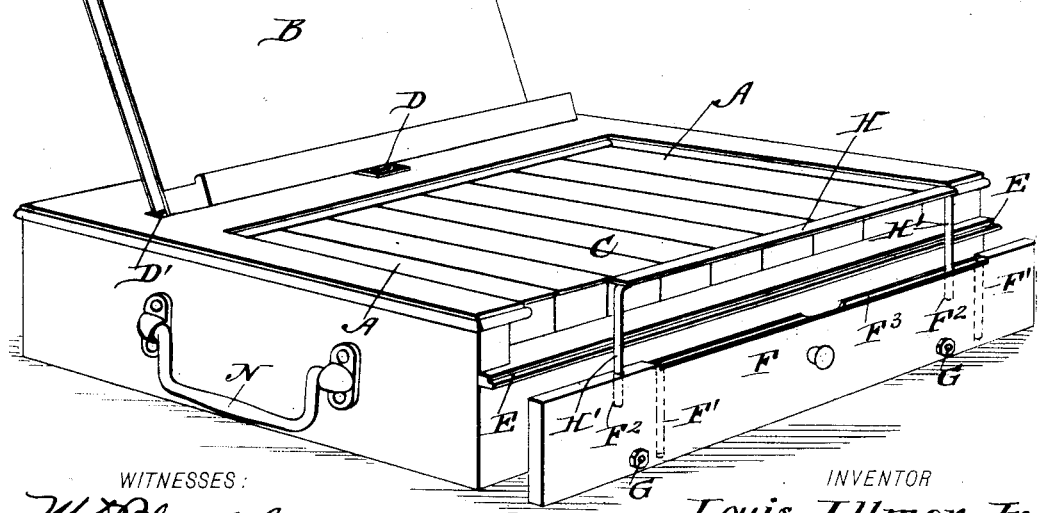
WITNESSES:
INVENTOR
Louis Illmer, Jr.
BY Munn & Co.
ATTORNEYS.

No. 610,448. Patented Sept. 6, 1898.
L. ILLMER, Jr.
MUTE CLAVIER.
(Application filed Sept. 28, 1897.)
(No Model.) 3 Sheets—Sheet 2.

WITNESSES:
M. D. Blondel
P. B. Turpin

INVENTOR
Louis Illmer, Jr.
BY Munn & Co.
ATTORNEYS.

No. 610,448. Patented Sept. 6, 1898.
L. ILLMER, Jr.
MUTE CLAVIER.
(Application filed Sept. 28, 1897.)
(No Model.) 3 Sheets—Sheet 3.
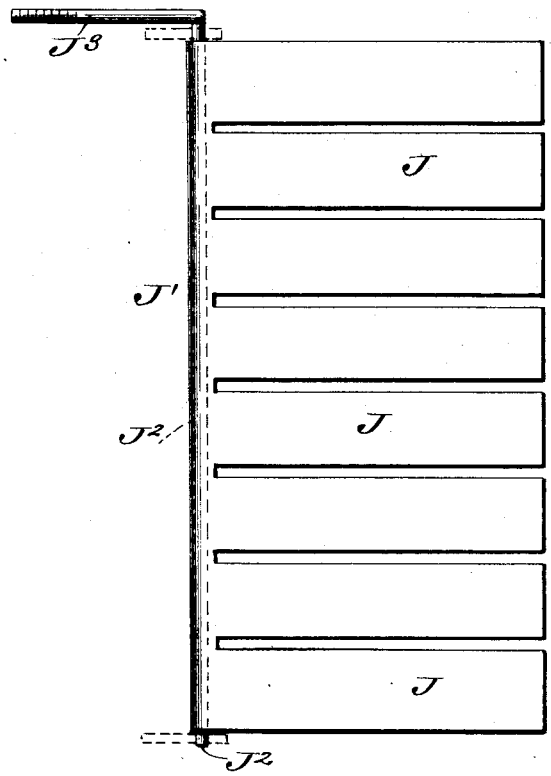
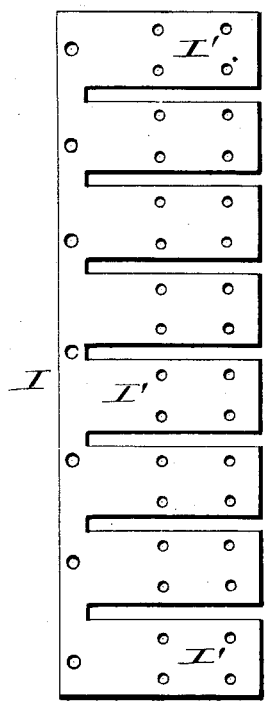
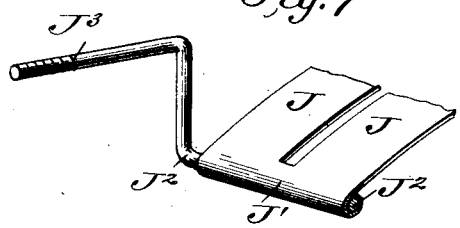
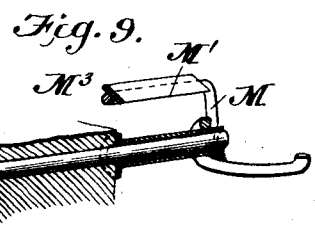
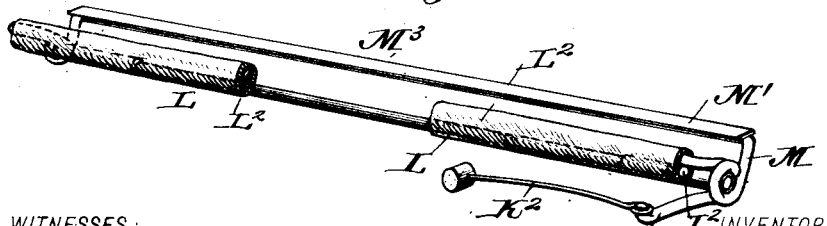
WITNESSES:
M. D. Blondel
P. B. Turpin
INVENTOR
Louis Illmer, Jr.
BY Munn & Co.
ATTORNEYS.

UNITED STATES PATENT OFFICE.

LOUIS ILLMER, JR., OF WASHINGTON, DISTRICT OF COLUMBIA, ASSIGNOR TO LOUIS ILLMER, SR., OF SAME PLACE.

MUTE CLAVIER.

SPECIFICATION forming part of Letters Patent No. 610,448, dated September 6, 1898.

Application filed September 28, 1897. Serial No. 653,348. (No model.)

*To all whom it may concern:*

Be it known that I, LOUIS ILLMER, Jr., residing at Washington, in the District of Columbia, have invented a new and useful Improvement in Mute Claviers, of which the following is a specification.

My invention is an improvement in mute claviers, and seeks to provide an exercising apparatus for use in studying the piano and designed especially for the cultivation of the so-called "connected style" or "strict legato" playing; and the invention consists in certain novel constructions and combinations of parts, as will be hereinafter described, and pointed out in the claims.

Figure 3:
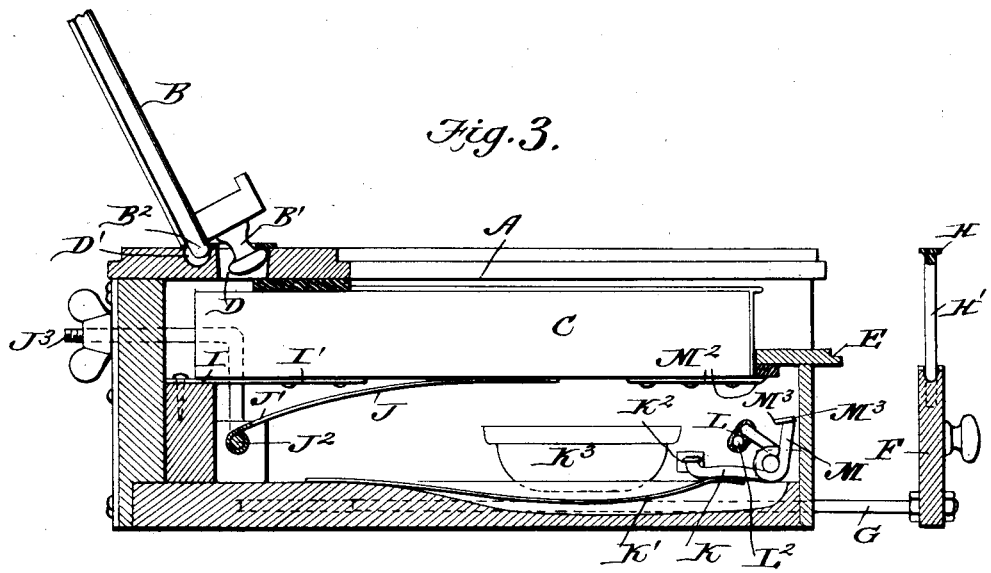
Figure 4:
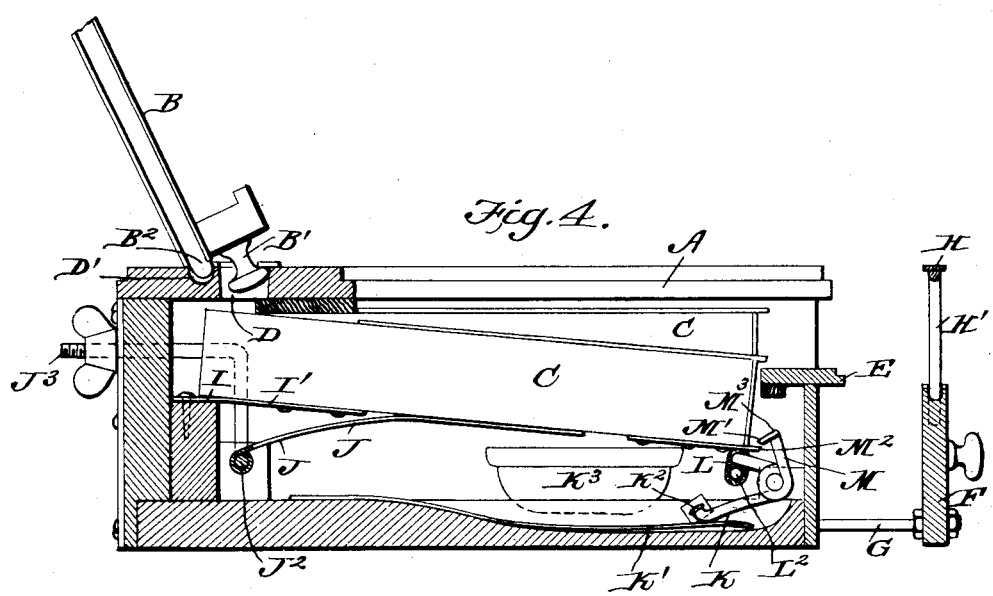

In the drawings, Figure 1 is a perspective view of the instrument closed. Fig. 2 is a similar view showing the case open for use. Figs. 3 and 4 are cross-sectional views of the apparatus. Fig. 5 is a detail view of the key-operating springs. Fig. 6 is a detail view of the key-supports. Fig. 7 is a detail view of the spring-adjusting mechanism. Fig. 8 is a detail view, partly broken away. Fig. 9 is a detail view showing the bearing for the action, and Fig. 10 is a detail view showing the slot through which the crank-arm projects.

According to the theory of legato playing, the first tone is to sound until the instant the second one begins. Suppose we have two keys A and B of a piano. Let A be struck, and then strike B. At the instant B begins to sound A must cease. With the mechanism of the piano any key commences to sound when such key reaches two-thirds of its downward course, and it stops sounding when it has returned two-thirds of its upward course. It is evident from these facts that according to the foregoing it would be necessary to have key A one-third from the top at the instant key B is one-third from the bottom. In so transferring the tone from A to B it will be noticed there is theoretically neither a break nor a lap of tone. It is rather easy to make the keys crossed, as described, since it requires the two keys to meet in the middle. Such principle is used in some practicing claviers, which are so arranged that the key B must reach the bottom at the instant the key A reaches the top. While this appears at first glance to solve the problem of constructing a musical exercising device, yet in practice this principle cannot be effectively applied or utilized in producing a well-connected or legato style of touch in which it is necessary to allow the two tones A and B to lap for an instant—that is, they must sound together slightly. Although this does not seem to be in strict accordance with the theory, it is a fact that all good players allow this lap, and a proper trial will convince the hearer that it is necessary to produce the desired effect.

In my present invention I provide for crossing the keys near the bottom of their stroke and furnish mechanism whereby if one key is not released in proper relation to the succeeding key such first key will either be held down, if not released quick enough, or will operate to sound a bell, if released too quickly, thus indicating positively to the player whether the touch and relative movement of the keys are correct.

The present invention is an improvement on devices such, for instance, as that illustrated in the patent issued to Oscar Felden, dated April 30, 1895, and numbered 538,579.

In carrying out my invention I provide a suitable case which is designed to support and inclose the several operating parts and is formed to present in miniature the general appearance of a piano and may be made of any suitable material and design and finished to suit the demand or taste of the user. The case has at A ways for the music-rack B, and is provided in rear of the keyboard C with a socket D to receive a head B' on the music-rack, and adjacent to said socket D with a groove D' to receive a rib or bead $D^2$ on the said music-rack, by which the latter is steadied in position when adjusted for use as a music-rack. It will be seen the music-rack may be adjusted to the case to serve as a cover for the keyboard or to support the sheet-music when the apparatus is being used. At the front of the case just below the keyboard I provide a rib E, below which is fitted a board or bar F, forming a part of the main portion of the hand-support, such bar F having a connection sliding in and out of the casing and consisting, preferably, of rods G near the ends of the bar F. This bar F may be drawn out any desired distance from the keyboard and supports the rest, which consists of a cross-bar H and depending rods H', which fit either in deep sockets F' or shallow sockets F² in the bar F, the cross-bar seating in a groove F³ in the top of bar F when the rods are in the deep sockets F', in which adjustment the bar F and the hand-rest applied thereto may be adjusted beneath the front rib of the casing, as shown. The keyboard has its keys suitably finished and supported at their rear ends, so their front ends may be depressed in the usual manner. It is preferred to support the keys on tongues I' integral with and extending from a plate I, which is suitably secured to the casing. It may be in the manner shown or in other suitable manner desired.

To give proper tension to the several keys, I provide tongues J, forming springs integral with and projecting from a plate J', secured to a shaft J², journaled in suitable bearings, and which has a projecting crank-arm provided with a threaded extension J³, which receives a set-nut which may be turned to adjust the shaft to vary the tension of the springs upon the keys, thus regulating the weight of the touch. The threaded extension J³ of the crank-arm is carried through a vertically-elongated slot J⁴ in the casing, so the said arm may move vertically as it is operated to vary the tension of the tongues J. In connection with the keys I employ what for convenience of reference I term the "action." This is journaled to the casing, so that it rocks, and is provided with a crank K, acting on the spring K', which normally returns the rocking action, and with a crank-like rail L, forming a bearing and stop for the keys, and with a crank-like detent M, having a portion M' arranged to overlap projecting plates M² at the lower front ends of the keys to prevent the upward movement of said keys when depressed until the action is readjusted by the upward movement of the rail-like stop. In forming the rail and the detent I prefer to bend the same from suitable wire and to brace the rail by an extra length L² of wire, the whole being covered by a felt, and to brace the detent by securing to its cross-bar the plate M³, which overlaps the plates M² on the keys. These plates M² are beveled, so they can pass the detent when the latter is lowered into engagement with a previously-depressed key, so that if one key be depressed and not released soon enough the subsequently-depressed key may also move into engagement with the detent. The crank K supports a bell-hammer K², which is arranged to strike the bell K³ when the action rocks upward to its uppermost position and operates to signal the release of one key sooner than the depresssion of the subsequent one, as will more fully appear from the description of the operation. I provide felt wherever necessary to cushion the stroke of the several parts and render the action similar to that of a piano.

At one side of the case I provide a handle N, by which it may be conveniently carried.

In operation if a key be depressed and then released before a second key is depressed the action will, as the first key moves upward, sound the bell and indicate to the pupil such mistake. On the other hand if a key be depressed it will cause the detent to move into engagement therewith, and if a second key be depressed too far before the first key is released the detent will hold the first key down, and so indicate the mistake which has been made. I thus provide for indicating positively to the pupil whether the second key is depressed too fast or too slow with respect to the release of the first key and enable such pupil to determine with accuracy whether the touch is being properly cultivated.

It will be understood that it is possible to depress more than one key at the same time, the result being the same whether one or more keys are simultaneously struck, the apparatus serving in all instances as an unerring guide in acquiring the genuine legato touch so much desired by all players.

Having thus described my invention, what I claim, and desire to secure by Letters Patent, is—

1. An exercising apparatus provided with keys and with a sounding device having a detent moving into engagement with the depressed key, substantially as described.

2. An exercising apparatus provided with keys and with a rocking sounding device having a detent which moves into engagement with the key when the latter is depressed, substantially as described.

3. An exercising apparatus provided with keys and with a sounding device having a detent which moves into engagement with the key when the latter is fully depressed and out of such engagement when the key is released whereby if one key is fully depressed before the previously-depressed key is released the first key will be held by the detent substantially as described.

4. The combination with the keys of a sounding device arranged to be acted on by all the keys and provided with a detent whereby to lock the key when depressed, substantially as described.

5. The combination of the keys, a detent, arranged for operation by the several keys, by which when the keys are depressed the detent will be set into engagement therewith whereby when one key is depressed and a second one is depressed prior to the release of the other the first key will be held by the detent and means for automatically readjusting the detent when pressure on the keys is removed substantially as described.

6. The combination with the keys of a depressible rail arranged to be depressed by and forming a stop for said keys and having a detent moving as the rail is depressed by the keys into engagement with the depressed key or keys and means for automatically readjusting the detent when pressure on the key is released, substantially as described.

7. An exercising apparatus comprising the keys and a rocking action having a crank-like rail forming a stop for the keys and a crank projection forming a detent movable into engagement with the keys when the latter are depressed substantially as described.

8. In an exercising apparatus, the combination of the keys, a detent operated by said keys and engaging the latter when they are depressed and moving out of said engagement as the key ascends whereby if a second key be depressed before the first is released, such first key will be held by the detent until the second key is released, substantially as described.

9. An exercising apparatus comprising the keys, a bell, a rocking action having a hammer to strike the bell a crank-like rail forming a stop for the keys and a means whereby such keys rock the shaft and a crank-like detent arranged to engage the keys when depressed, substantially as described.

10. An exercising apparatus, comprising the keys the springs exerting tension thereon, the shaft supporting said springs and having a bent crank-arm the nut threaded on the said arm and adapted to turn the shaft to vary the tension of the key-springs, and the case or frame having a slot through which the bent crank-arm extends substantially as described.

11. An apparatus substantially as described comprising the case having the ways and the socket, and the music-rack slidable in said ways and having a ball-like head to engage in the socket substantially as shown and described.

12. A case having ways for the combined music-rack and lid and a seat therefor combined with the keyboard and the combined music-rack and lid slidable in said ways to form a cover for the keyboard and removable from said ways and adapted to engage the seat when adjusted for use as a music-rack, substantially as described.

13. The case having the ways and the socket, and the groove adjacent to the latter, the keyboard and the music-rack slidable in said ways and provided with a ball to engage the socket and a rib to fit the groove, substantially as described.

14. In an exercising apparatus a hand-support comprising a main section having a set of deep sockets and a separate set of shallow sockets and the rest portion having depending rods fitting when in position for use, in the shallow sockets and in folded position in the deep sockets substantially as described.

15. In an exercising apparatus a hand-support comprising the main section or crossbar having in its upper side a longitudinal groove or recess and provided with a set of deep sockets and a separate set of shallow sockets and the rest portion having a crossbar fitted to and resting in the groove of the main portion when in folded position and provided with depending rods fitted to the deep and shallow sockets of the main portion substantially as described.

16. An exercising apparatus comprising the keys, a bell, a rocking action having a hammer to strike such bell and provided with a crank-like portion having a rail extended below and arranged to be operated on by the keys, substantially as described.

17. An exercising apparatus comprising the casing the keyboard and a sounding device having a rocking action provided with a crank-like rail which extends beneath and is arranged for engagement by the keys to rock the action and a spring actuating the action in opposition to the keys, substantially as described.

18. In an exercising apparatus substantially as described the combination with the keys of a plate having in one edge a series of slits or slots separating one edge of the plate into a series of similar tongues integral with each other and with the body of the plate whereby the tongues may all be secured by the same fastenings and may be secured in the desired relation and permanently held therein a rock-shaft to which said plate is fixed and means for adjusting said rock-shaft substantially as shown and described.

LOUIS ILLMER, Jr.

Witnesses:
SOLON C. KEMON,
P. B. TURPIN.